United States Patent
Yamakawa

(10) Patent No.: US 7,138,634 B2
(45) Date of Patent: Nov. 21, 2006

(54) NUCLEAR MEDICAL DIAGNOSTIC APPARATUS

(75) Inventor: Tsutomu Yamakawa, Nasu-Gun (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 10/735,620

(22) Filed: Dec. 16, 2003

(65) Prior Publication Data

US 2004/0124361 A1    Jul. 1, 2004

Related U.S. Application Data

(63) Continuation of application No. 09/521,901, filed on Mar. 9, 2000, now abandoned.

(30) Foreign Application Priority Data

Mar. 10, 1999   (JP)   ................. 11-063884
Mar. 2, 2000    (JP)   ................. 2000-57522

(51) Int. Cl.
*G01T 1/24* (2006.01)

(52) U.S. Cl. ................. 250/370.09; 250/370.06; 250/370.11; 250/370.13

(58) Field of Classification Search ........... 250/370.06, 250/370.09, 370.11, 370.13
See application file for complete search history.

(56) References Cited

U.S. PATENT DOCUMENTS

| | | | |
|---|---|---|---|
| 4,812,656 A | 3/1989 | Yamakawa et al. | |
| 4,857,737 A | 8/1989 | Kamae et al. | |
| 5,510,644 A | 4/1996 | Harris et al. | |
| 5,793,045 A | 8/1998 | Difilippo et al. | |
| 6,043,494 A | 3/2000 | Yamakawa et al. | |

FOREIGN PATENT DOCUMENTS

| | | |
|---|---|---|
| JP | 9-318751 | 12/1997 |
| JP | 10-160848 | 6/1998 |
| JP | 10-160849 | 6/1998 |

(Continued)

OTHER PUBLICATIONS

Cho et al. Resolution and sensitivity improvement in positron emission tomography by the first interaction point determination, 1991 IEEE Nuclear Science Symposium and Medical Imaging Conference, vol. 3 (Nov. 2-9, 1991), pp. 1623-1627.*

(Continued)

*Primary Examiner*—David Porta
*Assistant Examiner*—Shun Lee
(74) *Attorney, Agent, or Firm*—Oblon, Spivak, McClelland, Maier & Neustadt, P.C.

(57) ABSTRACT

A radiation detector has a plurality of semiconductor cells arranged in a matrix. Each of the plurality of semiconductor cells detects radiation separately, and outputs a signal representing the energy of radiation separately. A selection circuit selects, among events wherein radiation is detected, specific events wherein radiation derived from radio-isotope injected to a subject is detected. In the first case wherein either one semiconductor cell outputs a signal, the energy of the signal is compared with a predetermined energy window. In the second case wherein two or more semiconductor cells output two or more signals substantially simultaneously, the total energy of the two or more signals is compared with the predetermined energy window. A position calculation circuit calculates, in the first case the incidence position of the radiation based on the positions of the semiconductor cells that output signals.

6 Claims, 4 Drawing Sheets

FOREIGN PATENT DOCUMENTS

| | | |
|---|---|---|
| JP | 11-211833 | 8/1999 |
| JP | 11-281747 | 10/1999 |
| JP | 11-337646 | 12/1999 |
| JP | 11-344568 | 12/1999 |
| JP | 11-344573 | 12/1999 |

OTHER PUBLICATIONS

Comanor et al. Algorithms to identify detector Compton scattering in PET modules, IEEE Transactions on Nuclear Science, vol. 43, No. 4 (Aug. 1996), pp. 2213-2218.*

* cited by examiner

NUCLEAR MEDICAL DIAGNOSTIC APPARATUS

CROSS-REFERENCE TO RELATED APPLICATIONS

This application is a continuation application of and claims the benefit of priority from Ser. No. 09/521,901, filed Mar. 9, 2000 now abandoned, which claims the benefit of the prior Japanese Patent Application No. 11-063884, filed Mar. 10, 1999; and No. 2000-57522, filed Mar. 2, 2000, the entire contents of which are incorporated herein by reference.

BACKGROUND OF THE INVENTION

The present invention relates to a nuclear medical diagnostic apparatus for externally detecting gamma rays emitted from RI (Radio-Isotope) injected to a subject and generating an RI distribution in the subject on the basis of the detection data.

Nuclear medical diagnostic apparatuses are classified into planar image-type apparatuses which obtain an RI distribution on a projection plane and ECT-type (Emission Computed Tomography-type) apparatuses which obtain an RI distribution on a slice. The ECT type nuclear medical diagnostic apparatuses include a SPECT (Single Photon Emission Computed Tomography) apparatus using single photon RI such as $^{99m}$Tc or $^{111}$In, and a PET (Positron Emission computed Tomography) apparatus using positron RI such as $^{11}$C or $^{13}$N. Recently, apparatuses serving as both SPECT apparatuses and PET apparatuses have appeared. These apparatuses in general will be called nuclear medical diagnostic apparatuses hereinafter.

A conventional nuclear medical diagnostic apparatus has an Anger type radiation detector. As shown in FIG. 1, the Anger type radiation detector is comprised of a collimator 10, scintillator 11, lightguide 12, and plurality of PMTs (PhotoMultiplier Tubes) 13. When gamma rays come incident on the scintillator 11, fluorescence is generated at the incidence position. The fluorescence is detected by the plurality of PMTs 13. The sum of output signals from the plurality of PMTs 13 reflects the gamma ray energy. Among events wherein radiation is detected, an event derived from radio-isotope injected to the subject is selected on the basis of the total energy. The selected event is counted in association with the incidence position of the gamma rays. The incidence position of the gamma rays is calculated as, e.g., the barycentric position of energy.

Gamma rays having a high energy of 511 keV, which is derived from positron, often cause the Compton scattering in the scintillator 11. Because of the Compton scattering, energies E1 and E2 (incidence energy E0=E1+E2) are absorbed at two positions P1 and P2 almost simultaneously. One of the two positions P1 and P2 is the true incidence position.

Conventionally, however, the incidence position of the gamma rays is calculated as the barycentric position of an energy which does not coincide either of the two positions P1 and P2 or naturally the true incidence position. In other words, all the events wherein scattering occurs in the scintillator are counted as having occurred at erroneous positions. In addition, conventionally, whether scattering occurs in the scintillator cannot be determined.

In a PET-exclusive apparatus having a BGO (bismuth germanium oxide) detector for performing block detection as well, when gamma rays are scattered among blocks of the BGO detector, the PET-exclusive apparatus cannot separate events that occur simultaneously to obtain the accurate positions of the events by calculation. Accordingly, a decrease in counting precision cannot be avoided.

BRIEF SUMMARY OF THE INVENTION

It is an object of the present invention to decrease, in a nuclear medical diagnostic apparatus, the probability of an incidence position detection error derived from scattering in a radiation detector.

The radiation detector has a plurality of semiconductor cells arrayed in a matrix. Each of the plurality of semiconductor cells detects radiation separately, and outputs a signal representing the energy of radiation separately. A selection circuit selects, among events wherein radiation is detected, specific events wherein radiation derived from radio-isotope injected to a subject is detected. In the first case wherein either one of the semiconductor cells outputs a signal, the energy of the signal is compared with a predetermined energy window. In the second case wherein two or more semiconductor cells output two or more signals substantially simultaneously, the total energy of the two or more signals is compared with the predetermined energy window. A position calculation circuit calculates, in the first case, the incidence position of radiation on the basis of the position of the semiconductor cell that outputs a signal, and in the second case, the incidence position of radiation on the basis of the position of either one of the two or more semiconductor cells. A counting circuit counts the specific events in association with the calculated incidence position. The distribution of radio-isotope in the subject is obtained on the basis of this counting result.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiment of the present invention will be described with reference to the accompanying drawings.

First, the principle of how to reduce the probability of an incidence position detection error derived from the Compton scattering in a radiation detector will be briefly explained.

Figure 2:
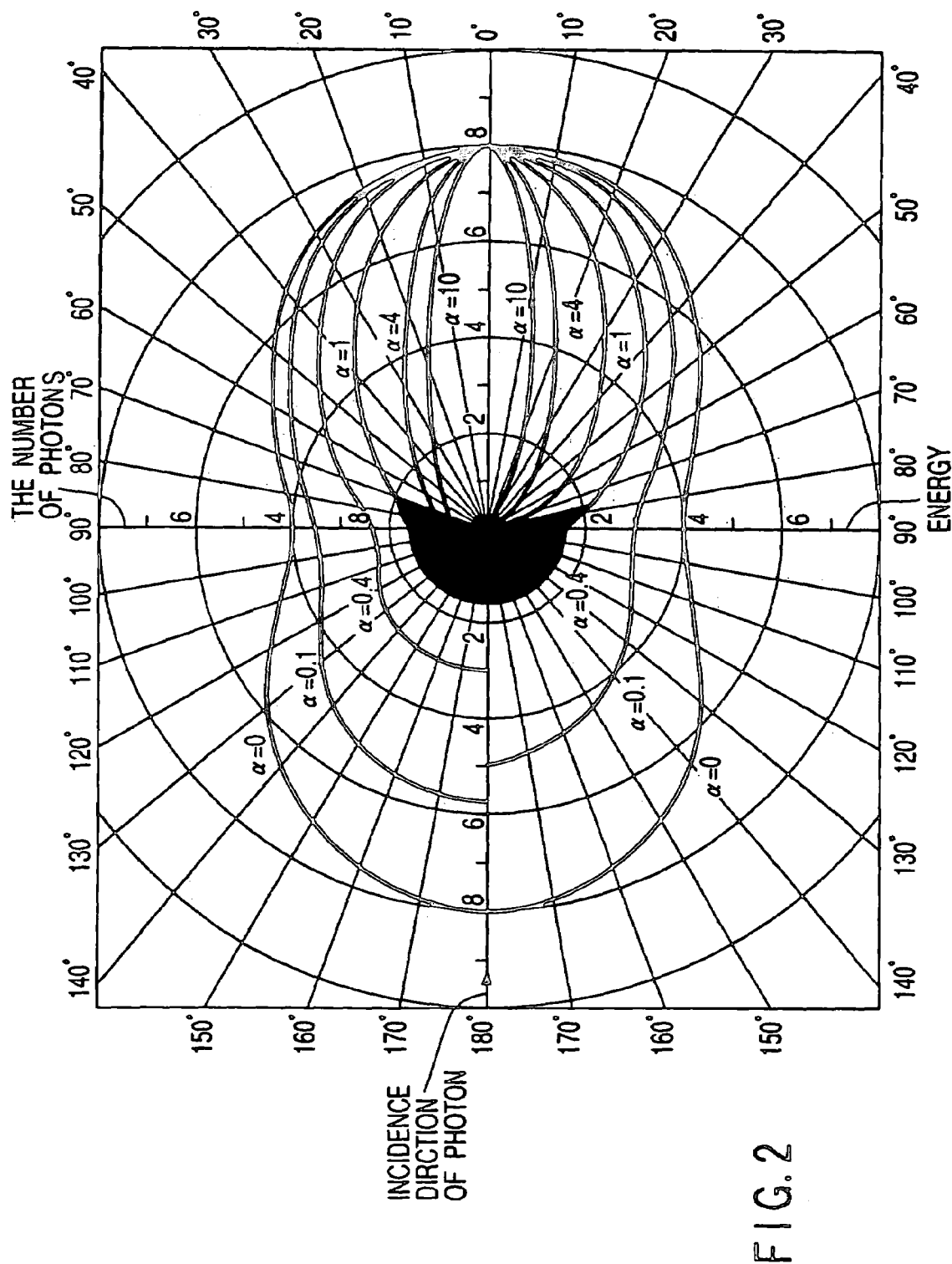
FIG. 2 is a view showing the frequency distribution of the Compton scattering angle with respect to the energy of the incidence gamma rays.

FIG. 2 shows the frequency distribution of the Compton scattering angle with respect to the energy of incidence gamma rays. Referring to FIG. 2, for example, when the energy of the incidence gamma rays is 511 keV ($\alpha$=1), this scattering is mostly forward scattering having a scattering angle of 90° or less. This tendency also applies to a case wherein the incidence gamma rays have an energy of 250 keV or more.

Figure 1:
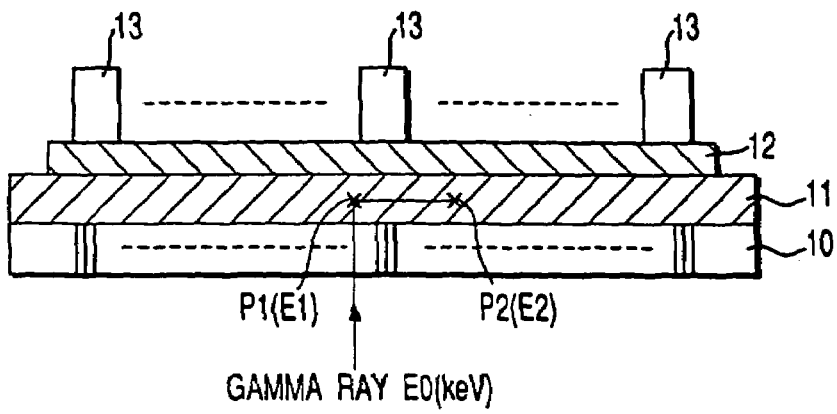
FIG. 1 is a sectional view of a conventional Anger type gamma camera.
Figure 3:
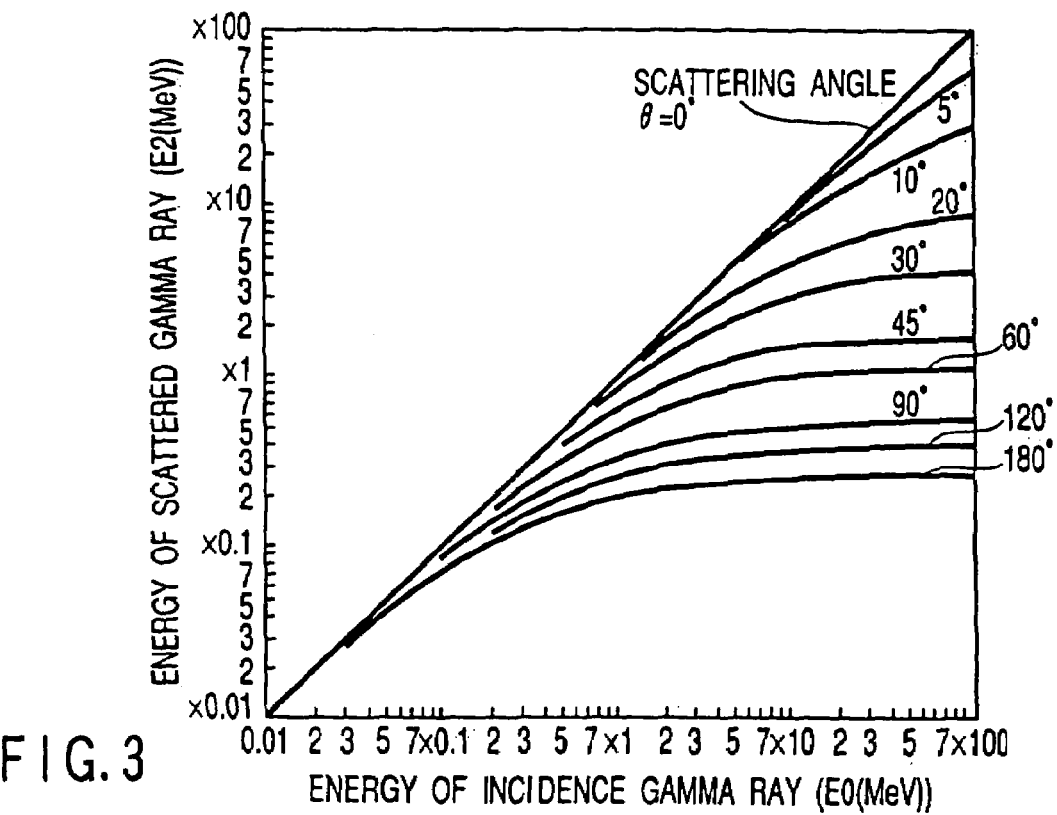
FIG. 3 is a graph showing the relationship between an incidence energy and the energy of scattered rays at various scattering angles.

FIG. 3 shows the relationship between an incidence energy and the energy of scattered rays at various scattering angles (0°, 5°, 10°, 20°, 30°, 45°, 60°, 90°, 120°, and 180°). In FIG. 3, the axis of abscissa represents the incidence energy (E0 (=E1+E2)), and the axis of ordinate represents the energy (E2) of the Compton scattered ray. From FIG. 3, it is obvious that when the incidence energy is 511 keV, that is, when these gamma rays are generated by positron, the energy E2 of the scattered ray falls within a range:

170 keV ($\theta$=180°)$\leq$E2<511 keV ($\theta$=0°) When the scattering energy E2 falls within a range:

170 keV$\leq$E2<255 keV (511 keV×½) then a scattering angle $\theta$ falls within a range 75°$\leq$$\theta$<180°

It is accordingly understood that 15% (painted portion in FIG. 2) of all the scattering events represents events having a scattering angle $\theta$ which falls within the range of 75°$\leq$$\theta$<180°. More specifically, it is concluded that, when gamma rays having an energy of 511 keV are scattered in the radiation detector only once, 85% of its scattering energy E2 is 256 keV (½ of 511 keV) or more. In other words, of the two energy absorption positions, the position where less energy is absorbed is determined as the scattering position (incidence position) with a probability of 85%.

This probability varies depending on the thickness and shape of the radiation detector. Simulation such as Monte Carlo simulation is performed in which the thickness and shape of the radiation detector are initialized. Through this simulation, the detection surface can be divided into areas having a high probability that the position with a less energy is the incidence position, and areas having a high probability that the position with a larger energy is the incidence position. Therefore, the first rule according to which the position with the less energy is selected as the incidence position, and the second rule according to which the position with the larger energy is selected as the incidence position, can also be selectively employed in units of areas.

When this determination method is employed, according to the present invention, ½ or more of the scattering events can be counted as having occurred at the true incidence positions, whereas the conventional. Anger type gamma camera counts all the scattering events as having occurred at erroneously detected positions.

According to another method of reducing the probability of an incidence position detection error, when scattering occurs in a detector, i.e., when two or more semiconductor cells of one detector output signals substantially simultaneously, this event is excluded from the counting target. With this method, although the counting efficiency decreases more or less, the position detection error ratio can be suppressed to almost zero.

Figure 4:
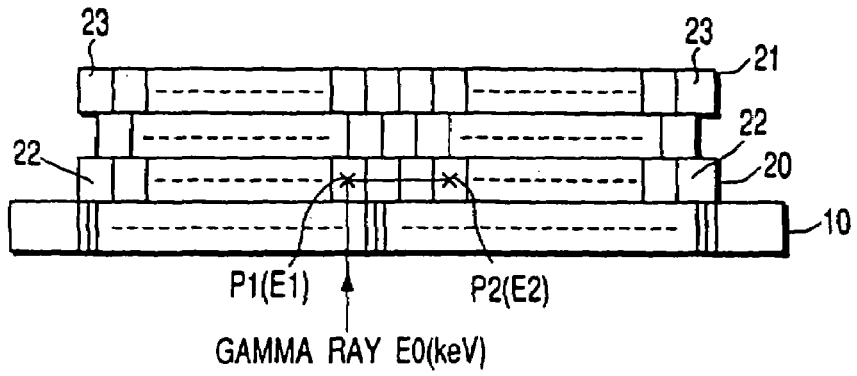
FIG. 4 is a schematic sectional view of a radiation detector used in a nuclear medical diagnostic apparatus according to an embodiment of the present invention.

FIG. 4 is a schematic sectional view of a semiconductor type radiation detector used in a nuclear medical diagnostic apparatus according to a preferable embodiment of the present invention. The radiation detector has a collimator 10, semiconductor cell array 20, and detection processing circuit 21. The semiconductor cell array 20 is formed on the rear surface of the collimator 10. The detection processing circuit 21 is formed on the rear surface of the semiconductor cell array 20. The semiconductor cell array 20 has a plurality of semiconductor cells 22 arranged in a matrix. The detection processing circuit 21 has a plurality of pre-amplifiers 23. The plurality of pre-amplifiers 23 respectively correspond to the plurality of semiconductor cells 22. The pairs of semiconductor cells 22 and pre-amplifiers 23 can detect radiation separately and output signals representing the energy of radiation separately. When the nuclear medical diagnostic apparatus is a coincidence PET apparatus, no collimator 10 is mounted on it.

The semiconductor cells 22 are made of, e.g., cadmium telluride (CdTe) or cadmium zinc telluride (CdZnTe). In place of the semiconductor cell array 20, a scintillation sensor formed by combining a scintillator (e.g., sodium iodide (NaI), LSO (Lutetium oxyorthosilicate), BGO (bismuth germanium oxide), and cesium iodide (CsI)) and a photoelectric conversion element (e.g., a photodiode) can be provided.

Figure 5:
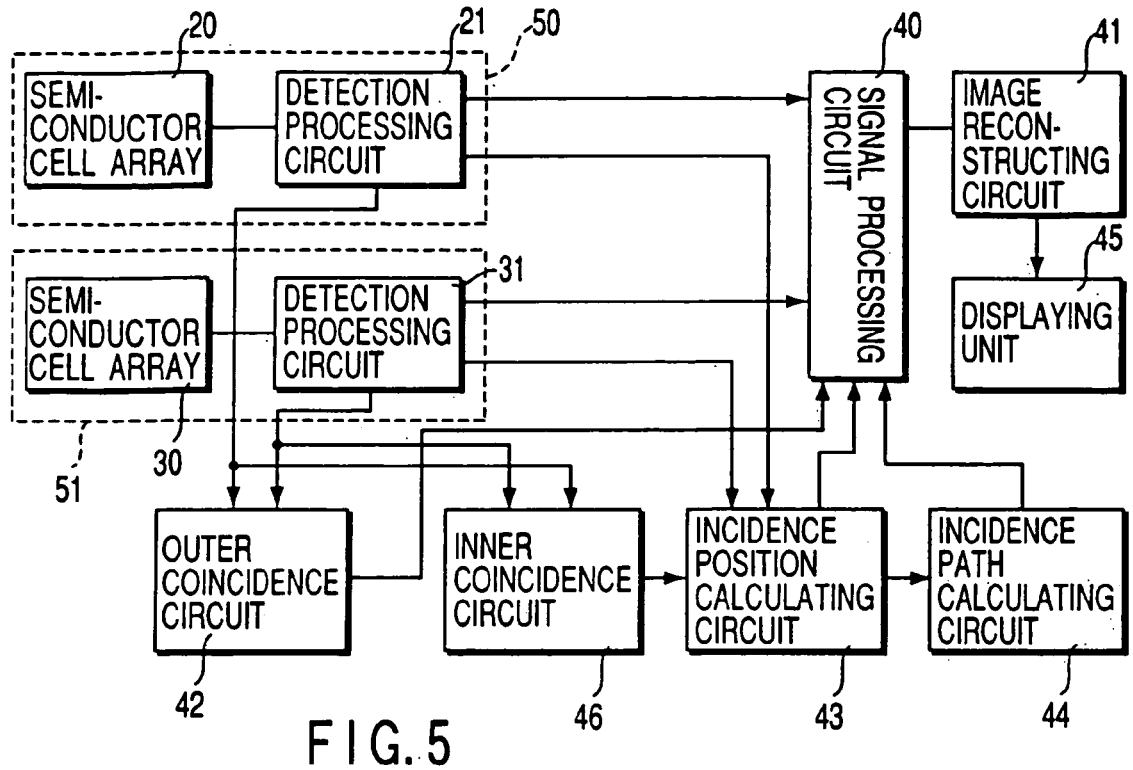
FIG. 5 is a block diagram showing the arrangement of the nuclear medical diagnostic apparatus having the radiation detector shown in FIG. 4.

FIG. 5 is a block diagram showing the arrangement of the nuclear medical diagnostic apparatus having two opposing radiation detectors each shown in FIG. 4. The nuclear medical diagnostic apparatus shown in FIG. 5 according to this embodiment serves as both a single photon emission computed tomography (SPECT) apparatus and a coincidence positron emission computed tomography (PET) apparatus. The present invention can be applied to any one of a gamma camera, an SPECT apparatus, and a PET apparatus which generate an RI distribution (planar image) on a projection plane.

Two radiation detectors 50 and 51 are arranged to oppose each other through a subject. One radiation detector 50 has a semiconductor cell array 20 and detection processing circuit 21. The other radiation detector 51 also has a semiconductor cell array 30 and detection processing circuit 31.

Output signals (signals representing energies) from the detection processing circuits 21 and 31 are supplied to a signal processing circuit 40. The signal processing circuit 40 selects, among all the events wherein gamma rays are detected, a specific event (target event) wherein gamma rays derived from radio-isotope injected to the subject are detected is selected.

More specifically, in the first case, a signal is output from either one semiconductor cell 22 of each of the radiation detectors 50 and 51. In this case, the energy of the signal is compared with a predetermined energy window. When the signal energy falls within the predetermined energy window, this event is counted as a target event in association with the incidence position or incidence path.

In the second case, two or more signals are output from two or more semiconductor cells 22 of one of the radiation detectors 50 and 51 because of the Compton scattering or the like (internal coincidence event). In this case, the energies of the two or more signals output from the radiation detector 50 or 51 substantially simultaneously are added, and their total energy is compared with the energy window. When the signal energy falls within the predetermined energy window, this event is counted as a target event in association with the incidence position or incidence path.

An internal coincidence circuit 46 calculates the time differences between the signal output from either one of the plurality of semiconductor cells 22 of one of the radiation detectors 50 and 51 and the signals output from the remaining semiconductor cells 22, and compares each time difference with a predetermined threshold. When the time difference is smaller than the predetermined threshold, the internal coincidence circuit 46 determines that this event falls under the second case (internal coincidence event), and outputs this determination result to the signal processing circuit 40.

In the first case (external coincidence event), an incidence position calculating circuit 43 calculates the incidence position of the gamma rays on the basis of the position of the semiconductor cell 22 that has output a signal. More specifically, the incidence position calculating circuit 43 calculates the central position of a semiconductor cell 22 that has output a signal as the incidence position of the gamma rays.

In the second case (internal coincidence event), the incidence position calculating circuit 43 calculates the incidence position of the gamma rays on the basis of the position of either one of the semiconductor cells 22 that have output signals substantially simultaneously. More specifically, the incidence position calculating circuit 43 calculates the central position of one semiconductor cell 22, selected from the plurality of semiconductor cells 22 that has output signals according to a predetermined rule, as the incidence position of the gamma rays.

An image reconstructing circuit 41 reconstructs a tomographic image (SPECT image or PET image) on the basis of an output from the signal processing circuit 40.

When the time difference between the signals output from the detection processing circuits 21 and 31 in PET counting is equal to or less than a predetermined threshold, an external coincidence circuit 42 checks whether an event wherein gamma rays are detected is a coincidence event (external coincidence event) wherein gamma rays derived from radio-isotope injected to a subject are detected. If so, the external coincidence circuit 42 outputs a signal representing an external coincidence event to the signal processing circuit 40. The signal processing circuit 40 counts this external coincidence event in association with an incidence path.

An incidence path calculating circuit 44 calculates a straight line connecting the incidence position of one radiation detector 50 and the incidence position of the other radiation detector 51, both of which have been calculated by the incidence position calculating circuit 43 during PET radiography, as the incidence path of the gamma rays. A displaying unit 45 displays a SPECT image or PET image obtained by image reconstruction of the image reconstructing circuit 41.

Figure 6:
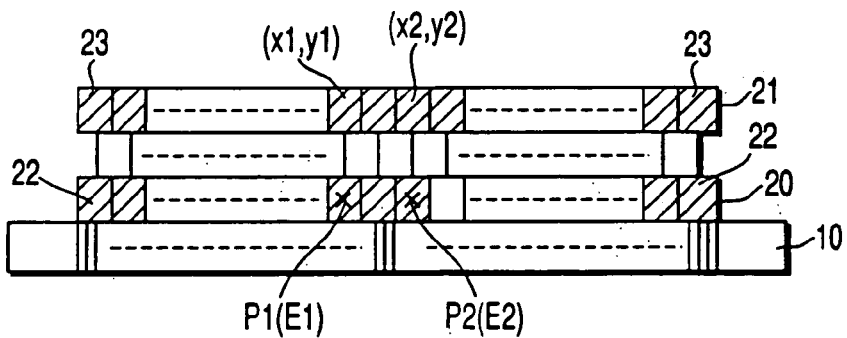
FIG. 6 is a view showing two positions where an energy caused by one scattering event in semiconductor cells is absorbed according to this embodiment.

FIG. 6 shows the second case wherein the gamma rays are scattered in the semiconductor cells 22 of the radiation detector 50 or 51 and their energy is absorbed at two points P1 and P2. In this case, signals are respectively output from semiconductor cells 22 corresponding to the positions P1 and P2 almost simultaneously. The energy absorbed at the position P1 is denoted as E1, and the energy absorbed at the position P2 is denoted as E2. Either one of the two positions P1 and P2 is the true incidence position.

(Event Selection)

The signal processing circuit 40 first adds the energies E1 and E2 to obtain the total energy (E1+E2). The signal processing circuit 40 then checks whether a relationship $Ec-W<E1+E2<Ec+W$ is satisfied, that is, whether the total energy falls within the predetermined energy window. Ec is the energy of gamma rays as the imaging target. When the energy of the gamma rays derived from positron is the target, Ec is set at 511 (keV). W is a value corresponding to ½ the window width of the predetermined energy window, and typically corresponds to about 5% to 10% of Ec.

When the above relationship is not satisfied, this event is regarded as an event other than incidence of gamma rays (random coincidence, rays scattered in the body, or the like), and is excluded from the counting target. When the above relationship is satisfied, this event is calculated as a target event in association with the incidence position and incidence path.

When the signal processing circuit 40 determines that this event falls under the second case, this event is excluded from the counting target regardless of whether it is a target event. Namely, an event falling under the second case need not be counted. In this case, although the counting efficiency is decreased, the incidence position detection error ratio can be completely decreased to zero.

The energy window described above can change depending on positions. In this case, the precision of the calculated incidence position can be improved remarkably. For example, the photoelectric absorption probability of 511-keV positron nuclide of a semiconductor cell, at a portion having a thickness of about 10 mm, made of cadmium telluride (CdTe) or cadmium zinc telluride (CdZnTe) described above is about 7.4%, and its scattering probability is about 28.5%. A probability that the energy of gamma rays which have been scattered once is absorbed in the semiconductor cell array 20 is present with a proportion unnegligible when compared to the photoelectric absorption probability described above. Therefore, if the calculating method described above is employed, the same effect as the equivalent improvement of the detection sensitivity (improvement of the count) can be obtained, when compared to a case wherein all the incidence positions of the gamma rays are erroneously calculated in an Anger type gamma camera.

(Position Calculation)

In the first case, the gamma ray incidence position is calculated on the basis of the position of one semiconductor cell 22 that has output the signal. More specifically, the central position of one semiconductor cell 22 that has output the signal is calculated as the gamma ray incidence position.

In the second case, the gamma ray incidence position is calculated on the basis of the position of either one semiconductor cell 22 among two or more semiconductor cells 22 that have output the signals substantially simultaneously. More specifically, the central position of the semiconductor cell 22, among the plurality of semiconductor cells 22 that have output signals, that has output a signal having the lowest energy is calculated as the gamma ray incidence position. According to this rule, the true incidence position can be obtained with a probability much higher than 50%, as described above.

According to another rule, calculation may be performed in the following manner. When the plurality of semiconductor cells 22 that have output signals substantially simultaneously are located in the first area of the detection surface, the central position of the semiconductor cell 22, among these semiconductor cells 22, that has output a signal having the lowest energy is calculated as the gamma ray incidence position. When the plurality of semiconductor cells 22 that have output signals substantially simultaneously are located in the second area of the detection surface, the central position of the semiconductor cell 22, among these semiconductor cells, that has output a signal having the highest energy is calculated as the gamma ray incidence position.

During coincidence counting, when gamma rays (gamma rays derived from positron) coming incident on the semiconductor cell array 30 in the radiation detector 51 are scattered and absorbed once, the gamma ray incidence position is calculated in accordance with the same calculation scheme as that described above.

Figure 7:
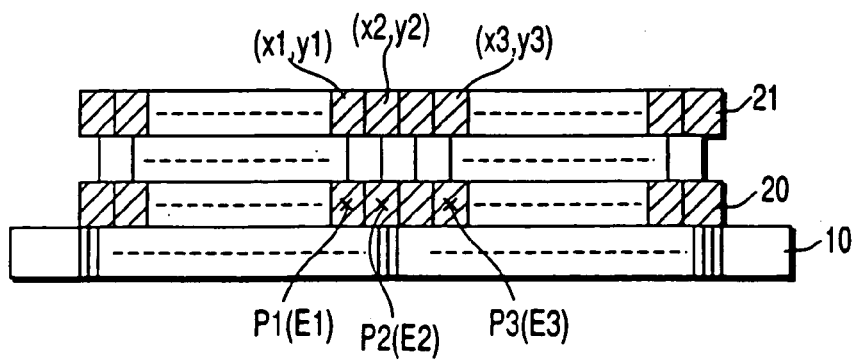
FIG. 7 is a view showing three positions where an energy caused by two scattering events in the semiconductor cells is absorbed according to this embodiment.

FIG. 7 shows a case wherein gamma rays are scattered at two positions. In this case, the energy is absorbed at three positions P1, P2, and P3. Namely, three semiconductor cells 22 output signals substantially simultaneously. The three signals respectively represent energies E1, E2, and E3 (keV).

(Event Selection)

The signal processing circuit 40 adds the energies E1, E2, and E3, and compares their total energy (E1+E2+E3) with a predetermined energy window. The signal processing circuit 40 then checks whether the total energy (E1+E2+E3) satisfies a relationship:

$$Ec-W<E1+E2+E3<Ec+W$$

If this relationship is not satisfied, this event is excluded from the counting target. If this relationship is satisfied, this event is counted as a target event in association with the incidence position and incidence path.

(Position Calculation)

The incidence position calculating circuit 43 selects, from the three semiconductor cells 22 that have output signals substantially simultaneously, one semiconductor cell 22 that has output a signal representing the minimum energy among the energies E1, E2, and E3, and calculates the central position of the selected semiconductor cell 22 as the incidence position. Alternatively, the incidence position calculating circuit 43 calculates the middle point of the central positions of the two semiconductor cells 22 that have output signals representing the two energies, obtained by excluding the maximum energy from the energies E1, E2, and E3, as the incidence position. To select which calculation scheme can be changed in accordance with the incidence energy.

For example, assume that the gamma rays, derived from positron, coming incident on the radiation detector, and scattered and absorbed first have the maximum energy. In this case, backscattering is dominant, and the two energies of the gamma rays absorbed after backscattering are small, so that the range is short in average. It is supposed that even if the two detection positions where these two energies are detected are averaged, a fluctuation in the calculated incidence position is small in average.

Assume that the gamma rays that are scattered the second time have the maximum energy. In the first scattering, forward scattering is dominant. If the detection positions of the two energies absorbed after first and last scattering are simply averaged, an incidence position more accurate in average than that obtained by weighted addition of the respective energies generated in an Anger type gamma camera can be obtained.

Assume that the gamma rays that are scattered the third time have the maximum energy. In two initial scattering cycles, forward scattering is dominant, and the range of the second scattering is long. Hence, when the detection positions of the two energies absorbed after two initial scattering cycles are simply averaged, the precision of the incidence position is largely improved.

As shown in FIG. 7, the probability that scattering occurs twice is much smaller than the probability that scattering occurs once. Yet, this can improve the precision of the calculated incidence position more than in the case using the Anger type gamma camera. In this manner, the calculation process of the incidence position as shown in FIGS. 6 and 7 can be applied to gamma rays which can cause forward scattering with a high probability (i.e., to gamma rays having a comparatively high energy).

Above explanation refers to calculation of the incidence position of gamma rays when relatively small energies are detected at two detection positions. When relatively small energies are detected at three or more detection positions, the barycenter of these detection positions may be calculated, and their barycentric position as the calculation result may be determined as the gamma ray incidence position.

Figure 8:
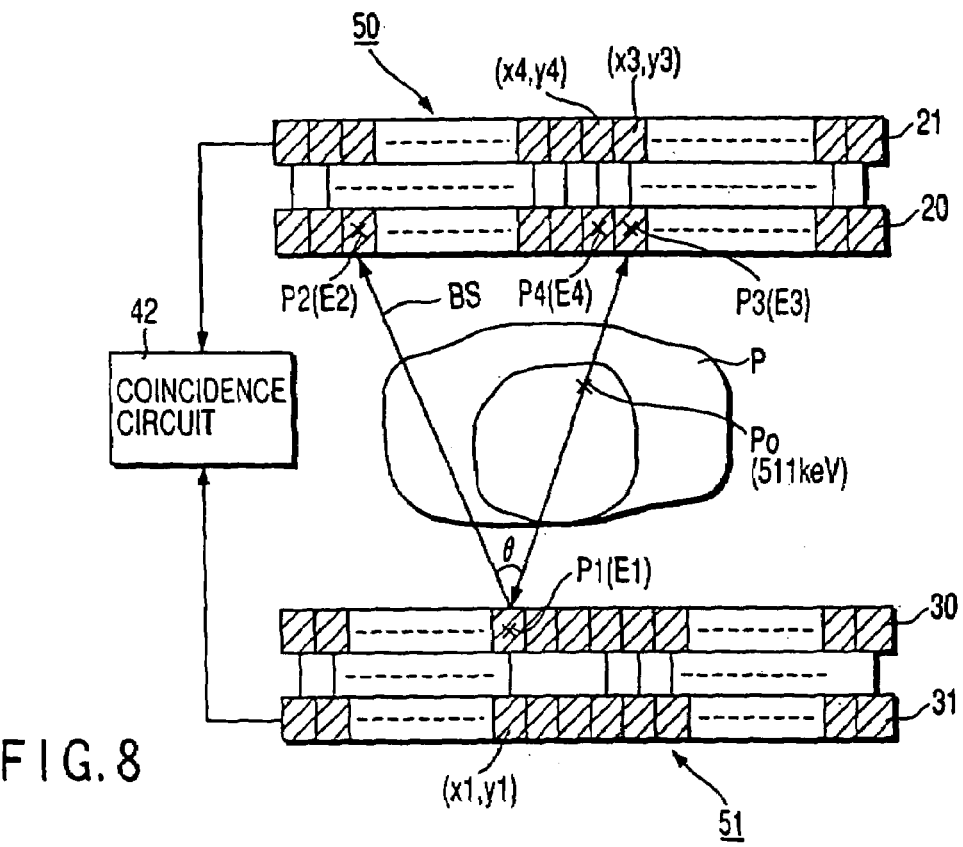
FIG. 8 is a schematic view showing the arrangement of a nuclear medical diagnostic apparatus having two opposing detectors according to this embodiment.

FIG. 8 is a view showing the schematic arrangement of a gamma camera as a nuclear medical diagnostic apparatus having two opposing detectors (an apparatus in which radiation detectors are arranged to oppose each other through a subject) according to the embodiment of the present invention, and explains a positron imaging method using this gamma camera. FIG. 8 is based on the following assumption. One gamma ray generated by positron Po comes incident on the radiation detector 50, is scattered once, and is then absorbed. The other gamma ray comes incident on the radiation detector 51 and is back-scattered at a scattering angle of θ. After that, backscattered gamma rays concerning the remaining energy come incident on the radiation detector 50 entirely and are absorbed. A gamma ray incidence path is calculated on this assumption. More specifically, FIG. 8 shows a case wherein three events occur in the radiation detector 50 simultaneously, whereas one event occurs in the radiation detector 51.

To perform coincidence counting, outputs (trigger signals) from positron generation time detection circuits (not shown) in the detection processing circuits 21 and 31 respectively formed in the two radiation detectors 50 and 51 that oppose each other through the subject P are output to the coincidence circuit 42. Based on these trigger signals, the coincidence circuit 42 checks whether energies E2, E3, and E4 of the gamma rays absorbed in the radiation detector 50 and an energy E1 of the gamma rays absorbed in the radiation detector 51 are related to the gamma rays generated by positron Po simultaneously.

If these energies are not recognized to be related to the gamma rays coming incident on the radiation detectors 50 and 51 simultaneously (if they are not recognized as coincidence counting), information on these energies should not contribute to positron imaging. If these energies are recognized to be related to the gamma rays coming incident on the radiation detectors 50 and 51 simultaneously, the incidence position calculating circuit 43 performs the following process in response to this recognition result on the basis of the energy signals and position signals output from the detection processing circuits 21 and 31.

First, assume that backscattering occurs in the radiation detector 51 and consequently backscattering gamma rays BS come incident on the radiation detector 50, as shown in FIG. 8. A scattering angle θ of the gamma rays BS falls within the range of 90°≦θ≦180°, and 90° scattering corresponds to about 220 keV. Accordingly, on the basis of the energy E1 absorbed in the radiation detector 51, whether a relationship 220<E1<511−W (keV) or E1<170 (keV) is satisfied is checked. Note that W is the window in interest, as described above.

If the relationship 220<E1<511−W (keV) or E1<170 (keV) is satisfied, information on the energy E1 should not contribute to imaging. If the energy E1 falls within the range of 170≦E1≦220, the energy E1 is added with each of the energies (E2, E3, and E4). Namely, E1+E2, E1+E3, and E1+E4 are calculated to acquire sums E1, E2, and E3.

It is checked whether each sum satisfies a relationship E1 (E2 or E3)<511−W (keV) or E1 (E2 or E3)>511+W (keV). If any sum satisfies either relationship, information on these energies should not contribute to imaging.

If a sum that satisfies a relationship 511−W≦E1 (E2, or E3)≦511+W (keV) exists, a position (x1, y1) in the radiation detector 51 where the energy E1 is detected is determined as the incidence position of the gamma rays derived from positron. In this case, the sum E1=E1+E2 satisfies the relationship 511−W≦E1≦511+W (keV).

The energy E2 used for determination of the gamma ray incidence position in the radiation detector 51 is excluded from the energies E2, E3, and E4 detected in the radiation detector 50, and two remaining energies E3 and E4 are added to acquire a sum E4.

On the basis of the sum E4, whether E4 satisfies the relationship E4<511−W or E4>511+W is checked. If the sum E4 satisfies this relationship, on the same principle as that of the case shown in FIG. 6, the position where a lower energy, of the two energies E3 and E4 that are added, is detected is determined as the incidence position where the gamma rays derived from positron come incident on the radiation detector 50. Then, the incidence path of the gamma rays derived from positron is calculated on the basis of the incidence positions on the radiation detectors 50 and 51.

The present invention is not limited to a case wherein three incidence events occur in the radiation detector 50. When two, or four or more incidence events occur, the same method as that described above can be used.

Figure 9:
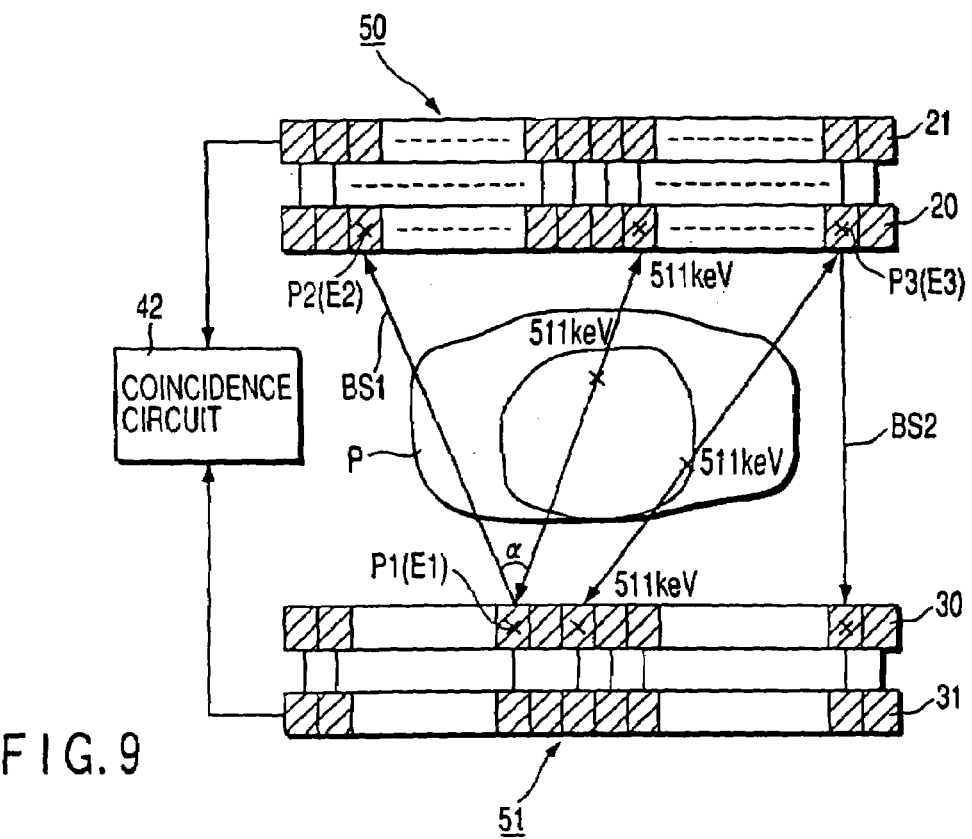
FIG. 9 is a view for explaining a gamma ray absorption correcting method utilizing backscattered rays in the apparatus of FIG. 8.

FIG. 9 explains a case wherein absorption correction of gamma rays is performed by utilizing backscattered rays, without using a special gamma ray absorption correction ray source, on the basis of the method described by using the gamma camera shown in FIG. 8. In FIG. 9, when backscattering is caused in two radiation detectors 50 and 51 opposing each other through a subject P as shown in FIG. 8, backscattered rays BS1 and BS2 come incident on the other radiation detectors 51 and 50, respectively. In this case, the energy values of these backscattered rays can be estimated with a certain fluctuation. Hence, these backscattered rays can be supposed to be the gamma ray absorption correction ray source having these energies.

More specifically, when acquiring ordinary coincidence counting PET, in addition to utilizing the backscattered rays BS1 and BS2 as described above, if the energy distributions of the backscattered rays at a certain detection position of the gamma rays at respective angles in the radiation detectors 50 and 51, and their frequencies are estimated from a certain typical patient model, gamma ray absorption correction data can be simply formed by using this estimation. By employing this method, absorption correction of the gamma rays can be performed without specially forming absorption correction data by using a gamma ray absorption correction ray source.

The method described with reference to FIGS. 8 and 9 is not limited to a case wherein the gamma camera described above, which has two opposing detectors, is used, but can also be applied to a gamma camera having three or more radiation detectors, a PET apparatus in which a radiation detector is arranged annularly, and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A nuclear medical diagnostic apparatus, comprising:
a radiation detector in a form of a single layer including a plurality of semiconductor cells that (1) are arranged in a matrix, (2) detect radiation separately, and (3) output signals representing an energy of the radiation separately;
a selection circuit which, in order to select, among events wherein the radiation is detected, a specific event wherein radiation derived from a radio-isotope injected into a subject is detected and a total energy of not less than two respective signals substantially simultaneously output from not less than two semiconductor cells falls in a predetermined energy window;
a position calculation circuit configured (1) to select one semiconductor cell of said not less than two semiconductor cells based only on respective energies of the not less than two respective signals, and (2) to calculate an incidence position based on a position of the selected one semiconductor cell;
a counting circuit configured to count the specific event in association with the calculated incidence position; and
a circuit configured to generate a distribution of radio-isotope in the subject on the basis of a counting result,
wherein said position calculation circuit is configured to select, from said not less than two semiconductor cells, said one semiconductor cell that outputs a signal representing a minimum energy, when said not less than two semiconductor cells are located in a first area, and to select said one semiconductor cell that outputs a signal representing a maximum energy, when said not less than two semiconductor cells are located in a second area.

2. An apparatus according to claim 1, wherein said selection circuit is configured to calculate time differences between a signal output from one of said plurality of semiconductor cells and signals output from remaining cells of said plurality of semiconductor cells.

3. The apparatus of claim 1, wherein the position calculation circuit is configured to calculate the incidence position as a central position of the selected one semiconductor cell.

4. A nuclear medical diagnostic apparatus, comprising:
a radiation detector in a form of a single layer including a plurality of semiconductor cells that (1) are arranged in a matrix, (2) detect radiation separately, and (3) output signals representing an energy of the radiation separately;
a selection circuit which, in order to select, among events wherein the radiation is detected, a specific event wherein radiation derived from a radio-isotope injected into a subject is detected and a total energy of not less than two respective signals substantially simultaneously output from not less than two semiconductor cells falls in a predetermined energy window;

a position calculation circuit configured (1) to select one semiconductor cell of said not less than two semiconductor cells, and (2) to calculate an incidence position based on a position of the selected one semiconductor cell;

a counting circuit configured to count the specific event in association with the calculated incidence position; and a circuit configured to generate a distribution of radio-isotope in the subject on the basis of a counting result of the counting circuit, wherein said position calculation circuit is configured to select, from said not less than two semiconductor cells, said one semiconductor cell that outputs a signal representing a minimum energy, when said not less than two semiconductor cells are located in a first area, and to select said one semiconductor cell that outputs a signal representing a maximum energy, when said not less than two semiconductor cells are located in a second area.

5. A method for generating a distribution of a radio-isotope in a subject with a nuclear medical diagnostic apparatus including a radiation detector in a form of a single layer, the radiation detector having a plurality of semiconductor cells arranged in a matrix, comprising:

detecting radiation derived from the radio-isotope with the plurality of semiconductor cells that output respective signals;

comparing a total energy of not less than two respective signals output from not less than two semiconductor cells with a predetermined energy window;

selecting one semiconductor cell of said not less than two semiconductor cells based only on respective energies of the not less than two respective signals; and calculating an incident position of the radiation based on a position of only the selected one semiconductor cell, wherein said selecting step comprises selecting, from said not less than two semiconductor cells, said one semiconductor cell that outputs a signal representing a minimum energy, when said not less than two semiconductor cells are located in a first area, and to select said one semiconductor cell that outputs a signal representing a maximum energy, when said not less than two semiconductor cells are located in a second area.

6. The method of claim 5, wherein the calculating step comprises:

calculating the incidence position as a central position of the selected one semiconductor cell.

* * * * *